US008836222B1

(12) United States Patent
Patrick et al.

(10) Patent No.: US 8,836,222 B1
(45) Date of Patent: Sep. 16, 2014

(54) METHOD, APPARATUS AND SYSTEM FOR ADAPTIVE LIGHT PROJECTION

(71) Applicant: Google Inc., Mountain View, CA (US)

(72) Inventors: William Graham Patrick, San Francisco, CA (US); Eric Teller, Palo Alto, CA (US); Johnny Lee, Mountain View, CA (US)

(73) Assignee: Google Inc., Mountain View, CA (US)

( * ) Notice: Subject to any disclaimer, the term of this patent is extended or adjusted under 35 U.S.C. 154(b) by 83 days.

(21) Appl. No.: 13/673,821

(22) Filed: Nov. 9, 2012

(51) Int. Cl.
*H05B 37/02* (2006.01)

(52) U.S. Cl.
USPC .......................................................... 315/154

(58) Field of Classification Search
USPC ................................................. 315/151, 154
See application file for complete search history.

(56) References Cited

U.S. PATENT DOCUMENTS

| 7,530,019 | B2 | 5/2009 | Kjeldsen et al. |
| 8,162,486 | B2 | 4/2012 | Borger et al. |
| 8,199,108 | B2 | 6/2012 | Bell |
| 2005/0128437 | A1 | 6/2005 | Pingali et al. |
| 2011/0243380 | A1 | 10/2011 | Forutanpour et al. |
| 2012/0230696 | A1* | 9/2012 | Pederson et al. ............... 398/115 |
| 2012/0326958 | A1* | 12/2012 | Deuel et al. .................... 345/156 |
| 2014/0001960 | A1* | 1/2014 | Wendt et al. .................... 315/151 |

OTHER PUBLICATIONS

Kjeldsen, et al., "Interacting with Steerable Projected Displays; In: Proc. of 5th International Conference on Automatic Face and Gesture Recognition (FG"02). Washington, DC, May 20-21, 2002", 6 pgs.

* cited by examiner

*Primary Examiner* — Don Le
(74) *Attorney, Agent, or Firm* — Blakely Sokoloff Taylor & Zafman LLP

(57) ABSTRACT

Methods, apparatuses and systems for adaptive light projection are described herein. According to embodiments of the disclosure, optical data of a physical space around a user is received. Light from a light source is then projected onto a projection area that is determined based, at least in part, on the received optical data.
User commands may include requests to locate and/or track objects within the physical space around the user. User commands may comprise a combination of the audible user command and a physical user gesture—e.g., a gesture identifying an object or a surface to receive the projected light.

20 Claims, 8 Drawing Sheets

METHOD, APPARATUS AND SYSTEM FOR ADAPTIVE LIGHT PROJECTION

TECHNICAL FIELD

Embodiments of the disclosure relate to the field of lighting systems, and more particularly, to adaptive light projection.

BACKGROUND

Lighting systems exist to illuminate rooms, pathways and objects. In order to have a flexible and adaptable lighting arrangement, solutions utilize multiple light sources to be activated and controlled manually by a user. What is needed is a solution capable of receiving a variety of user inputs to create dynamic light projection solutions.

BRIEF DESCRIPTION OF THE DRAWINGS

The present disclosure will be understood more fully from the detailed description given below and from the accompanying drawings of various embodiments of the disclosure, which, however, should not be taken to limit the invention to the specific embodiments, but are for explanation and understanding only.

DETAILED DESCRIPTION

Embodiments of an apparatus, system and method for adaptive light projection are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1:
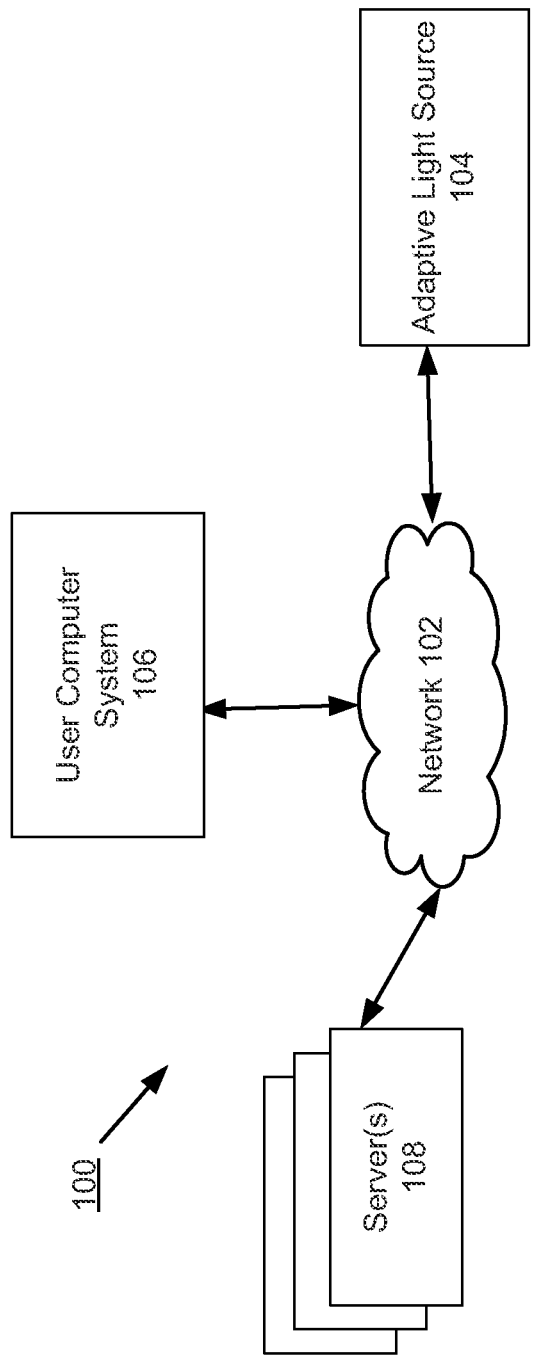
FIG. 1 is a block diagram of a system architecture for enabling adaptive light projection according to an embodiment of the disclosure.

FIG. 1 is a block diagram of a system architecture for enabling adaptive light projection according to an embodiment of the disclosure. In this embodiment, system 100 includes adaptive light source 104, user computer system 106, and one or more server(s) 108 communicatively coupled via network 102. In one embodiment, adaptive light source 104, user computer system 106, and server(s) 108 may comprise computing devices, such as a desktop computer, laptop computer, personal digital assistant, tablet computer, a mobile telephone, a cellular communication enabled wearable device, etc. In one embodiment, adaptive light source 104 is a web-enabled self-contained computing device. Although a single adaptive light source and user computer system are illustrated in system 100, in the embodiments discussed herein, a plurality of adaptive light sources and/or a plurality of user computer systems may be deployed to support user command and gesture based projection areas as discussed below.

Adaptive light source 104, user computer system 106, and server(s) 108 may be communicatively coupled via network 102 that communicates any of the standard protocols for the exchange of information. In one embodiment, user computer system 106 and adaptive light source 104 may be coupled with network 102 via a wireless connection, such as a cellular telephone connection, wireless fidelity connection, etc. Adaptive light source 104, user computer system 106, and server(s) 108 may run on one Local Area Network (LAN) and may be incorporated into the same physical or logical system, or different physical or logical systems. Alternatively, adaptive light source 104, user computer system 106, and server(s) 108 may reside on different LANs, wide area networks, cellular telephone networks, etc. that may be coupled together via the Internet but separated by firewalls, routers, and/or other network devices. It should be noted that various other network configurations can be used including, for example, hosted configurations, distributed configurations, centralized configurations, etc.

In one embodiment, adaptive light source 102 includes a projector mounted in an elevated position (e.g., ceiling, wall, raised pedestal). The projector mount may be actuated to dynamically steer the projector in response to a user command (e.g., an audible command or a user gesture as discussed below). An optical sensor (e.g., a camera system) and/or an audio sensor (e.g., a microphone) are included in system 100 and are communicatively coupled to controller logic and/or modules executed by user computer system 106. The optical sensor may be mounted with adaptive light source 104 (e.g., a projector) or separately mounted on an independently steerable mount. In some cases light sources and multiple optical sensors are mounted in an elevated position to display and capture images of a user and the physical space surrounding the user from multiple perspectives. The controller can steer projected light or images onto various surfaces throughout the physical space surrounding the user. Using an auto focus and zoom lens, the light or images can be focused onto variable distanced surfaces and enlarged or shrunk at will. Using gesture controls and voice commands, users can interact with the system anywhere within the room, as described below. Said gesture controls may be analyzed via image and audio recognition processes, executed by any combination of user computer system 106 and servers 108.

In some embodiments, users can request lighting in their general vicinity (e.g., workspace lighting) with either an audible command or a physical gesture, such as hand gestures or eye movements. For example, a user can use a voice command to request extra projected light, specify characteristics of the projected light (e.g., color and/or brightness level) and perform explicit gestures such as a hand gesture to define the location and/or spot size of the lighting. In embodiments where adaptive light source 104 comprises a steerable projector, it may be actuated to place the requested light at the requested location. In embodiments where adaptive light source 104 comprises multiple light projectors, one of the projectors is selected to place the requested light at the requested location (e.g., a projector capable of projecting light according to characteristics of the user request is selected, a projector closest to the requested location is selected, etc.). System 100 may also detect implicit gestures performed by a user, in addition to explicit gestures. For example, if a prolonged user gaze is detected towards an unlit or dimly lit area around the user, embodiments of the disclosure may interpret these actions as an implicit gesture to project light towards this area.

In some embodiments, users can request that projected light be used to locate and/or track objects included in the physical space around the user. A user can use voice commands to request that adaptive light source 104 locate an object in the physical space around the user (e.g., "Where are my car keys?" "Where is my phone?"). System 100 may utilize user computing device 106 and/or servers 108 to perform an image recognition process to scan the physical space around the user; if the item is found, then a steerable projector may be actuated to place a spotlight on the item (or alternatively, one of a plurality of lights sources is selected to place a spotlight on the item). A user can also use voice commands and hand gestures to have lighting track a moving item or person in the room.

Figure 2:
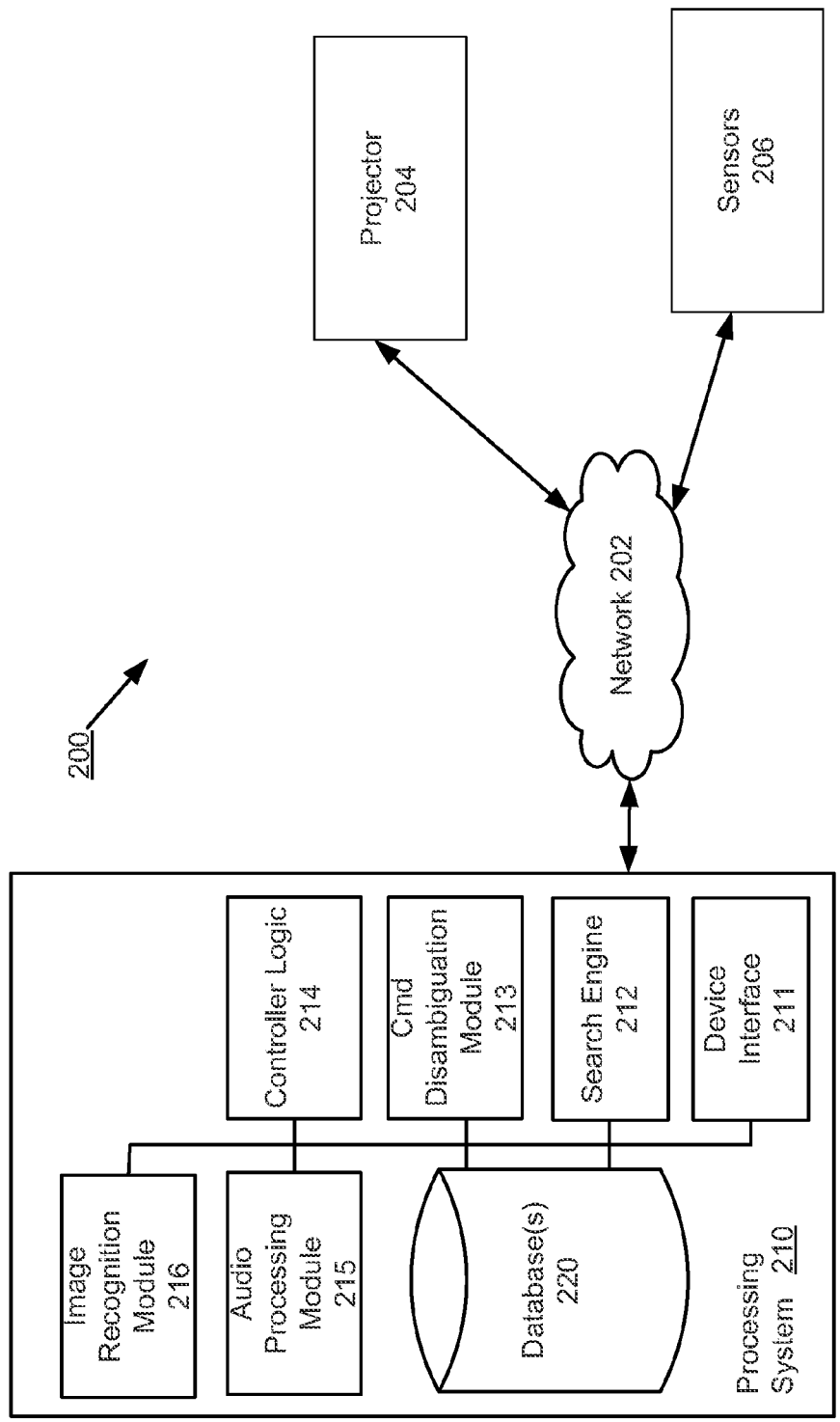
FIG. 2 is a block diagram of a system architecture for receiving user requests for adaptive light projection according to an embodiment of the disclosure.

FIG. 2 is a block diagram of a system architecture for receiving user requests for adaptive light projection according to an embodiment of the disclosure. System 200 illustrates multiple devices, including multiple logic and module blocks, for exemplary purposes. Any block labeled as logic or a module in this example may be implemented as a processor-executable software, firmware, hardware or any combination in other embodiments. Furthermore, the functionality of system 200 in this example may be included in one or any plurality of devices in any combination.

System 200 includes projector 204, sensors 206, and processing system 210 communicatively coupled via network 202. Projector 204 may include one or more light sources configured to project light within a physical space surrounding a user. Sensors 206 include an optical sensor to capture optical data of the physical space. In one embodiment, said optical sensor comprises an infrared (IR) sensor to capture low light optical data representing the physical space. In one embodiment, said optical sensor comprises an image sensor to capture photographic or video data of the user and the physical space. Sensors 206 may also include an audio sensor to capture audio data that includes user voice requests for projected light or images.

Processing system 210 includes device interface 211 to receive/send data from/to sensors 206 and projector 204. Data received from sensors 206 is used to interpret the user request for light and data sent to projector 204 is used to select and/or move projector light sources in order to project light as requested by the user.

Image recognition module 216 may process image data received from sensors 206 to interpret user gestures made and/or locate objects within the physical space surrounding the user. Audio processing module 215 may process audio data to analyze user voice requests for light as it relates to the physical space around the user.

User voice commands alone may be ambiguous without interpreting additional context. Command disambiguation module 213 performs recognition processes on the sensor data to obtain data related to the user's current context; this data is used to disambiguate user commands—i.e., translate the user request into a more specified request. For example, a user may issue the voice command: "Project light around that." Alone, this voice command is ambiguous and cannot be interpreted to determine a projector area; however, when combined with image data of a user pointing at an object, command disambiguation module 213 may determine the user is requesting light to be projected on and around the object that the user is pointing to.

Search engine 212 may execute a search within database 220 (which may store object images or object information such as barcode information) or execute a web-based search for an object identified in a user command. For example, a user may issue the command: "Find my phone;" search engine 212 may search for images of the user's phone previously stored in database 220 or may execute a web-based search for images of phones. The results of these searches are used in image recognition processes executed by image recognition module 216.

Figure 3:
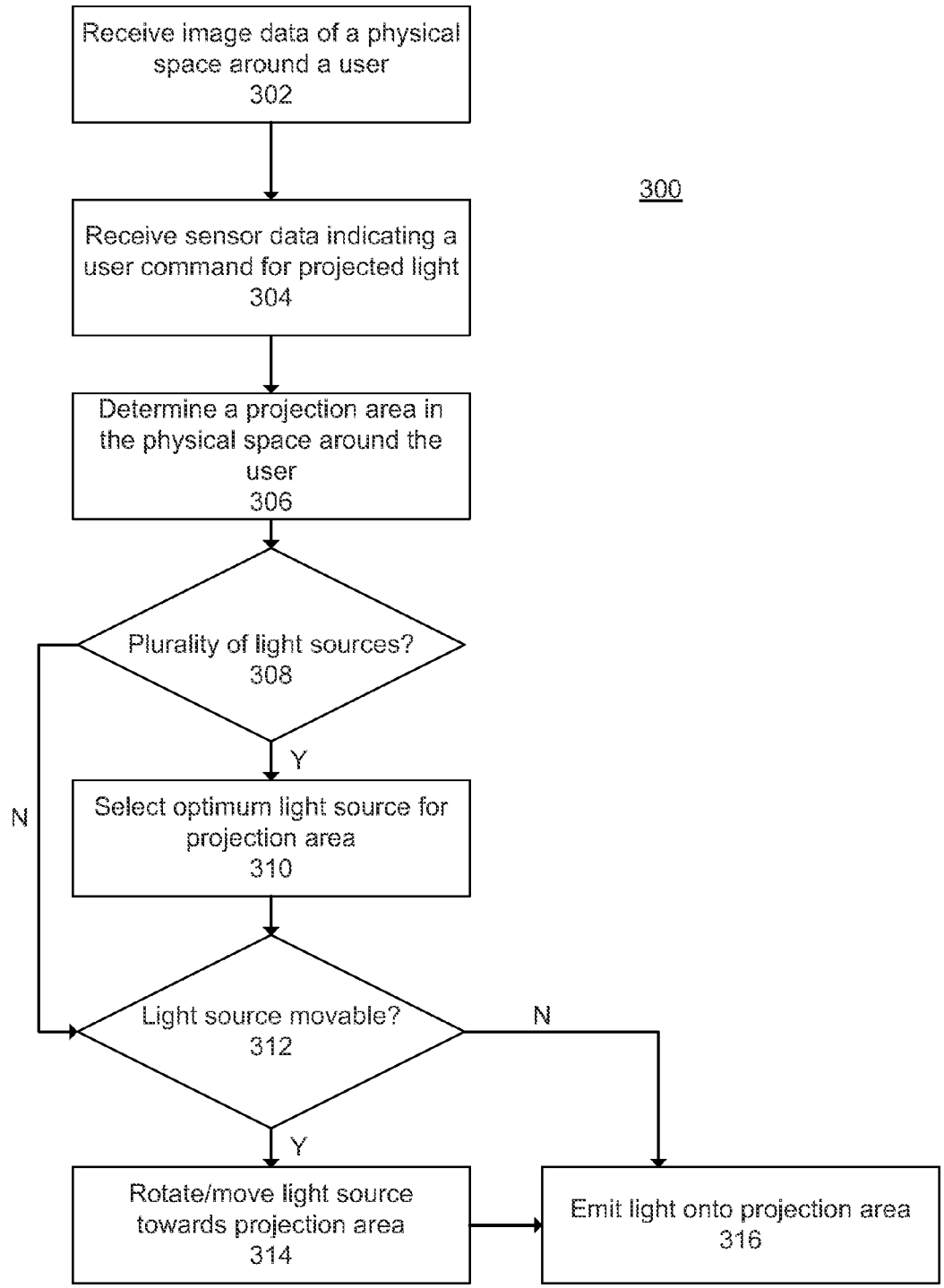
FIG. 3 is a flow diagram of a process for determining adaptive light projection areas according to an embodiment of the disclosure.

Controller logic 214 is used to control projector 204 so that light is projected according to the received user request. Controller logic may send commands to select and/or move projector light sources of projector 204 in order to project light as requested by the user FIG. 3 is a flow diagram of a process for determining adaptive light projection areas according to an embodiment of the disclosure. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the disclosure; thus, not all actions are required in every implementation. Other process flows are possible.

Process 300 is performed by processing solutions that may comprise hardware (circuitry, dedicated logic, etc.), software (such as software run on a general purpose computer system or a dedicated machine), firmware, or a combination. Process 300 may be performed by any combination of client and server devices.

An adaptive lighting system controller receives image data of a physical space around a user of an adaptive lighting system, 302. This image data is used to determine where, within the physical space around the user, the requested light is to be projected (e.g., on an object or a user gesture-defined space). Said adaptive lighting system controller receives sensor data indicating a user request for projected light, 304. In some embodiments, said sensor data comprises the same image data of the physical space around the user of operation 302; the user request may comprise a user gesture pointing to an object to be illuminated by the light source, or a user gesture that defines a desired projection area. In some embodiments, said sensor data comprises audio data that includes a voice command for a request for projected light. In some embodiments, said sensor data includes both audio and video data, where the user request for projected light is determined by both a user voice command and image data of an object or a user gesture. In some embodiments, said sensor data further comprises data measuring physical aspects of the environment around the user (e.g., heat, humidity, electrical fields, etc.). For example, if the user issues the voice command/query "Where's my coffee?", embodiments of the disclosure utilizing sensors to measure heat (such as an IR sensor) may detect the relative heat of the objects around the user to locate objects likely to fulfill the user's request.

Said adaptive lighting system controller determines a projection area within the physical space surrounding the user, 306. Said projection area may be a space near the user that is defined by the request (via a voice command or a user gesture) or may be an area to include an object in the physical space around the user.

If there are a plurality of light sources, 308, said adaptive lighting system controller selects an optimum light source to project light onto the projection area, 310. For example, a light source that is closest to the projection area may be selected, a light source that has an unobstructed line of sight to the projection area may be selected, a light source capable of emitting a brightness level or color according to the user request may be selected, etc.

If the light source is movable or adjustable (e.g., rotatable, steerable, or otherwise physically movable by the control system), 312, the light source is rotated, steered or moved in an optimum position or otherwise adjusted to project light onto the projection area, 314. Said adjustments may be focusing or broadening the light to be projected towards the projection area. Light is then emitted by the light source onto the projection area, 316.

Figure 4A:
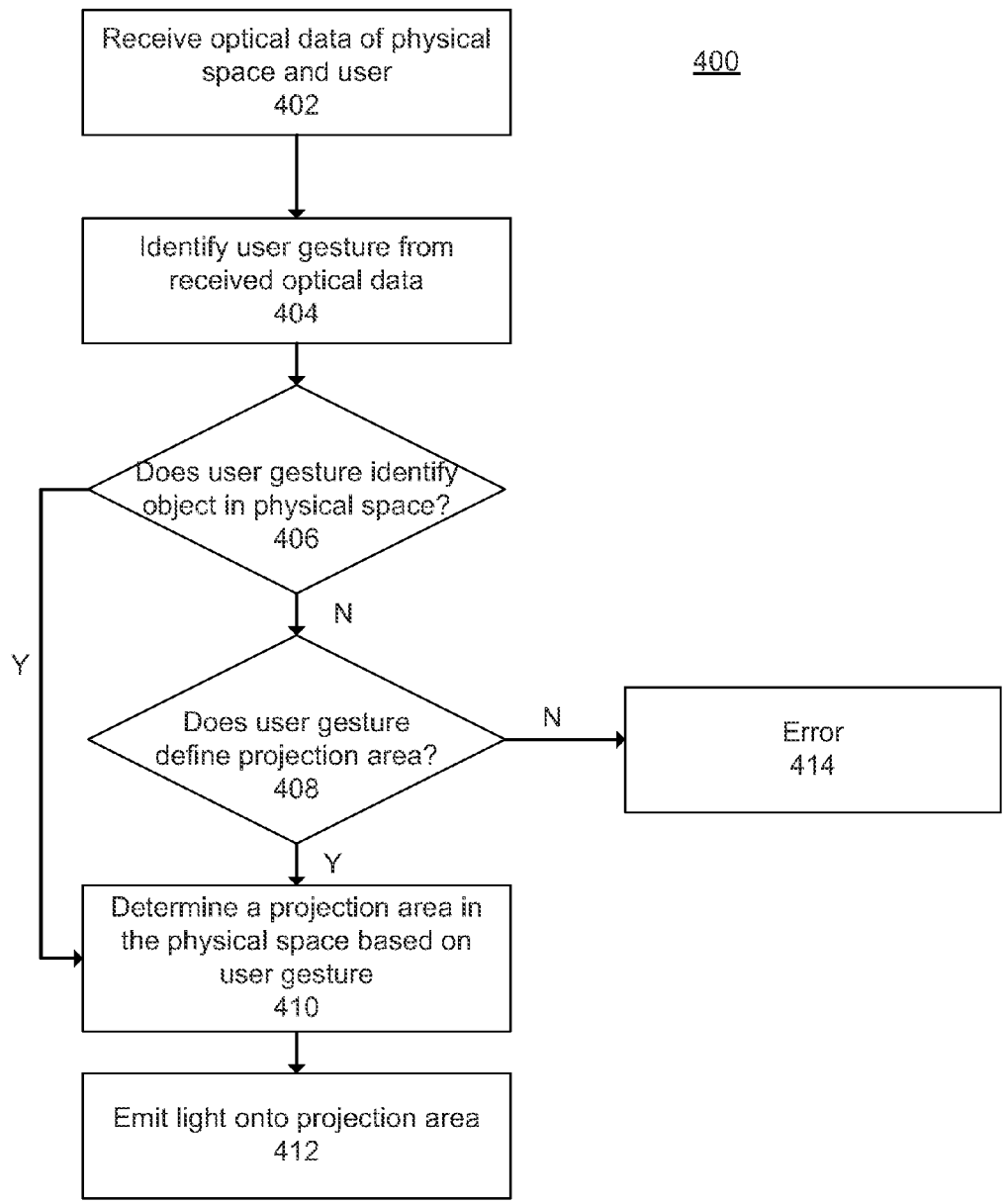
FIG. 4A is a flow diagram of a process for determining an adaptive light projection area based on received image data according to an embodiment of the disclosure.

FIG. 4A is a flow diagram of a process for determining an adaptive light projection area based on received image data according to an embodiment of the disclosure. Process 400 is performed by processing solutions that may comprise hardware (circuitry, dedicated logic, etc.), software (such as software run on a general purpose computer system or a dedicated machine), firmware, or a combination. Process 400 may be performed by any combination of client and server devices.

In this example, optical data of a physical space surrounding a user (and thus including the user) is received, 402. Said optical data includes image data of a user gesture indicating the desired location of the projection area within the physical space around the user. Said optical data may comprise, for example, video data that includes a series of user gesture movements, or IR optical data captured from an IR sensor during low light conditions.

A user gesture is identified from the received optical data, 404. This user gesture may comprise hand gestures or eye movements towards to an object or surface within the physical space surrounding the user, or a series of hand movements defining the desired projection area. It is determined if the user gesture identifies an object in the physical space, 406. For example, the optical data may show a user pointing to a nearby object, or at a surface or location within the physical space (e.g., workspace, tabletop, wall). If the user gesture does not identify an object in the physical space, it is determined whether the user gesture defines the bounds of the desired projection area, 408. For example, the user may move his hand in a circular motion to define the relative size and location of a desired projection of light. User gestures may also comprise implicit gestures rather than explicit gestures. For example, if a user is reading a book and he performs an implicit gesture indicating that there is insufficient light for reading (e.g., holding the book very close to his face, squinting or straining while reading) then embodiments of the disclosure may interpret these actions as an implicit gesture and provide light on the book as though it had been explicitly requested.

If the user gesture either identifies an object for light to be projected onto, or defines a projection area, 410, light is emitted onto a determined projection area, 412. Otherwise, a user error is presumed, 414, and an error handling process may occur (e.g., prompting the user to repeat the command, a default action such as projecting light onto the user, etc.).

Figure 4B:
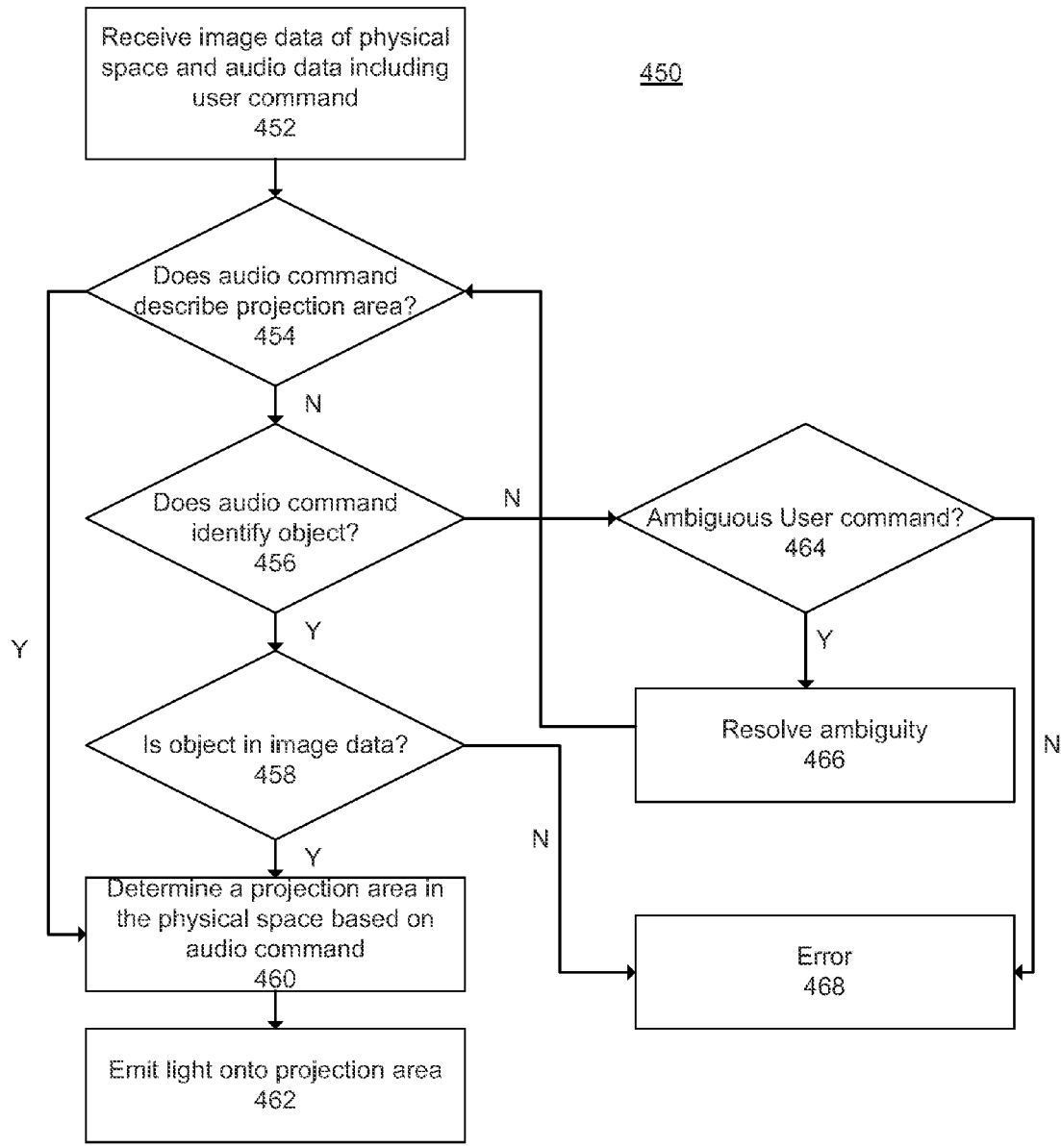
FIG. 4B is a flow diagram of a process for determining an adaptive light projection area in response to receiving audio data.

FIG. 4B is a flow diagram of a process for determining an adaptive light projection area in response to receiving audio data. Process 450 is performed by processing solutions that may comprise hardware (circuitry, dedicated logic, etc.), software (such as software run on a general purpose computer system or a dedicated machine), firmware, or a combination. Process 450 may be performed by any combination of client and server devices.

Image data of the physical space surrounding a user and audio data including a user voice command is received, 452. The audio data is analyzed to identify a user voice command and to determine if the voice command describes a projection area, 454 (e.g., "project light around me", thus describing a projection area around the user's current location). If the voice command describes a projection area, then the projection area is determined based on the voice command and the image data, 460. Otherwise, the audio data is analyzed to determine if the audio command identifies an object, 456. A user voice command may simply identify the object (e.g., "project light onto the table") or may comprise a request for an object to be located and have light projected onto it (e.g., "find my keys"); if the object can be identified from the image data, 458, the image data is analyzed to locate the object and determine the projection area, 460.

If the user voice command neither defines the projection area nor identifies an object, the voice command is analyzed to determine if any command ambiguities exist, 464. Projection areas may not be determinable from user voice commands without interpreting additional context. For example, a user may issue the voice command: "Project light around this object." Alone, this voice command is ambiguous and cannot be interpreted to determine a projection area; however, when combined with image data of a user holding an object, command disambiguation processes may determine the user is requesting light be projected on and around the object that the user is holding, thereby resolving the ambiguity, 466. Otherwise, if an ambiguity cannot be resolved, or a requested object cannot be found in the received image data, a user error is presumed, 468, and an error handling process may occur (e.g., prompting the user for a command, a default action such as projecting light onto the user, etc.).

Once the projection area has been determined, light is then emitted onto the projection area, 462. In some embodiments, a user voice command specifies light characteristics (e.g., brightness, color), and this type of light is emitted onto the projection area.

Figure 5:
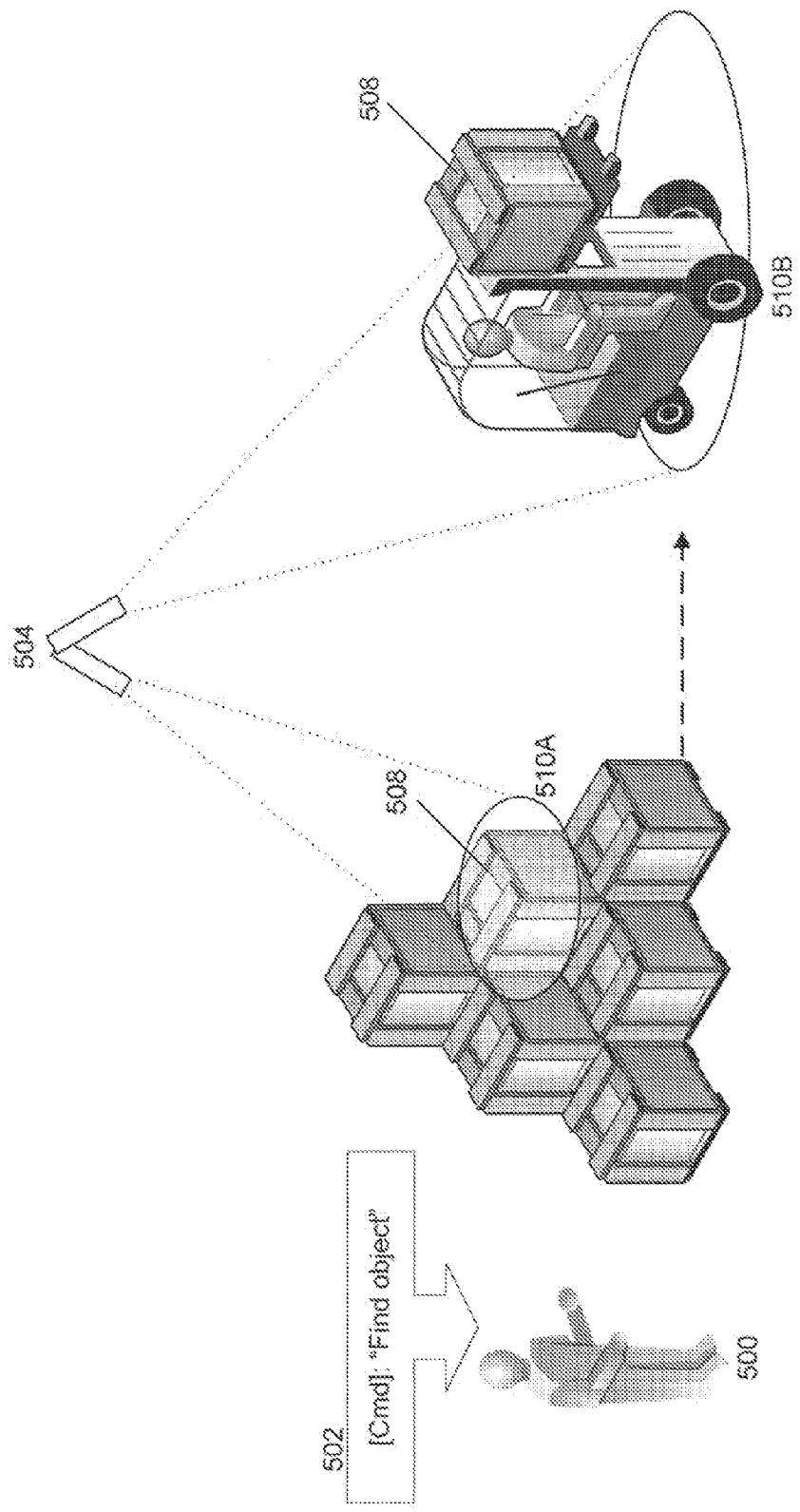
FIG. 5 is an illustration of a user issuing a voice command for projected light according to an embodiment of the disclosure.

FIG. 5 is an illustration of a user issuing a voice command for projected light according to an embodiment of the disclosure. In this example, user 500 issues voice command 502 to locate object 508—i.e., user 500 issues a voice command identifying the object for light to be projected onto, and makes no corresponding user gesture to identify the object.

Image data of the physical space around the user is analyzed via an image recognition process to locate object 508 within the physical space around user 500. As described above, the executed image recognition process may utilize a pre-stored image of object 508, a pre-stored image of object information of object 508 (e.g., inventory identification information or barcode information), or execute a web-based search for images of object 508.

Light source 504 then projects light onto this object by projecting light onto projection area 510A. If object 508 is movable, the adaptive lighting system controller may "track" object 508 by projecting light onto the object as it moves (shown as projection area 510B). In this example, tracking is accomplished by actuating (e.g., swiveling) light source 504 to project light from projection area 510A to projection area 510B. In other embodiments where adaptive light sources comprise a plurality of light sources, objects may be tracked by dynamically selecting light sources based on the object's movement.

Figure 6:
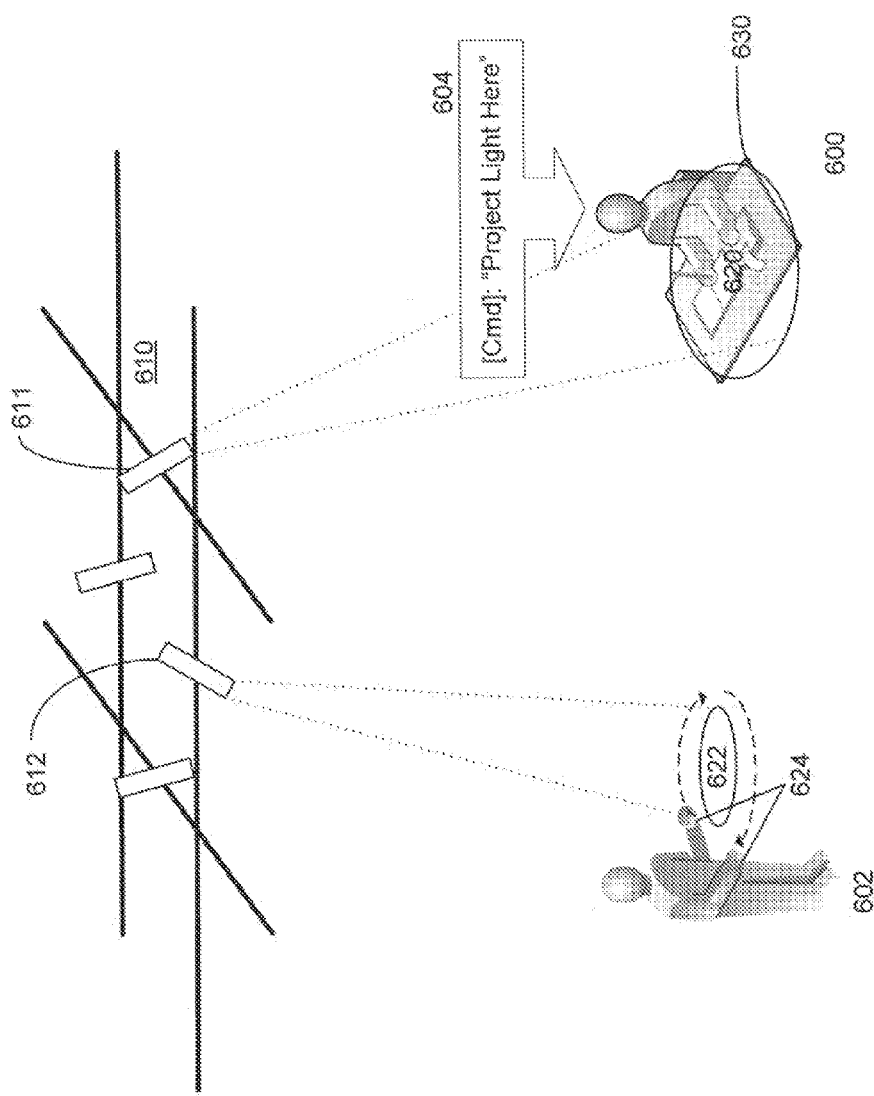
FIG. 6 is an illustration of multiple users issuing commands for projected light according to an embodiment of the disclosure.

FIG. 6 is an illustration of multiple users issuing commands for projected light according to an embodiment of the disclosure. In this example, user 600 issues audible command 604: "project light here." In this example, user 600 makes no accompanying gesture. Furthermore, audible command 604 ambiguously describes the desired light projection area as "here;" analyzing audio data alone would fail to identify where "here" is. The adaptive lighting system controller for light sources 610 analyzes command 604 and image data surrounding user 600 to determine that "here" likely refers to tabletop 630, and thus projects light onto workspace projection area 620.

In this example, user 602 also requests projected light from light sources 610. In this example, user 602 is shown to be performing user gesture 624—illustrated as hard gestures defining the boundaries of a desired projection area. The user may accompany this gesture with an audio command, or the control system for light sources 610 may be configured to project light when certain user gestures are identified. Based on user gesture 624, light sources 610 project light onto projection area 622.

In this embodiment, light sources 610 comprise a plurality of projectors; therefore, optimum light sources may be selected for each user request. In this example, light source 611 is selected for projection area 620, while light source 612 is selected for projection area 622, due to their proximity to their respective projection areas.

Figure 7:
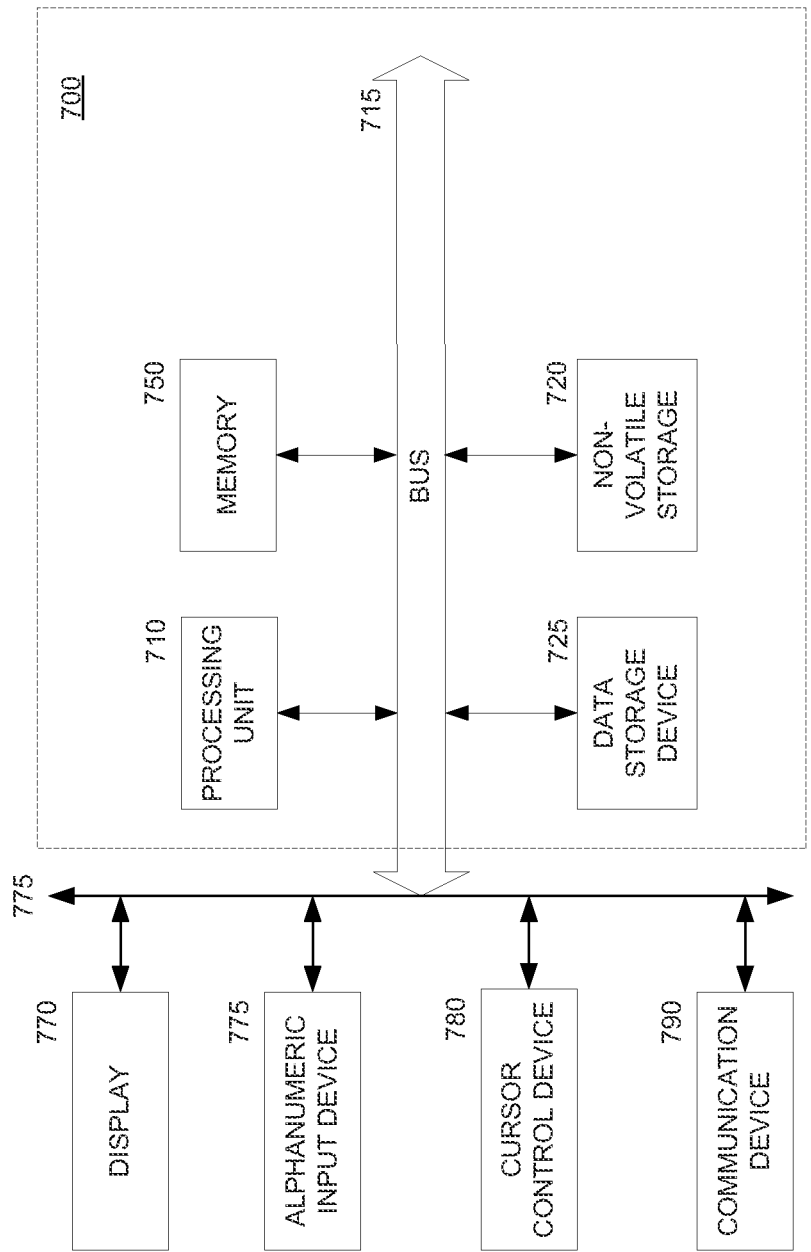
FIG. 7 is an illustration of a mobile computing device to utilize an embodiment of the disclosure.

FIG. 7 is an illustration of a mobile computing device to utilize an embodiment of the disclosure. Platform 700 as illustrated includes bus or other internal communication means 715 for communicating information, and processor 710 coupled to bus 715 for processing information. The platform further comprises random access memory (RAM) or other volatile storage device 750 (alternatively referred to herein as main memory), coupled to bus 715 for storing information and instructions to be executed by processor 710. Main memory 750 also may be used for storing temporary variables or other intermediate information during execution of instructions by processor 710. Platform 700 also comprises read only memory (ROM) and/or static storage device 720 coupled to bus 715 for storing static information and instructions for processor 710, and data storage device 725 such as a magnetic disk or optical disk and its corresponding disk drive. Data storage device 725 is coupled to bus 715 for storing information and instructions.

Platform 700 may further be coupled to display device 770, such as a cathode ray tube (CRT) or a liquid crystal display (LCD) coupled to bus 715 through bus 765 for displaying information to a computer user. Alphanumeric input device 775, including alphanumeric and other keys, may also be coupled to bus 715 through bus 765 for communicating information and command selections to processor 710. An additional user input device is cursor control device 780, such as a mouse, a trackball, stylus, or cursor direction keys coupled to bus 715 through bus 765 for communicating direction information and command selections to processor 710, and for controlling cursor movement on display device 770. In embodiments utilizing a touch-screen interface, it is understood that display 770, input device 775 and cursor control device 780 may all be integrated into a touch-screen unit.

Another device, which may optionally be coupled to platform 700, is a communication device 790 for accessing other nodes of a distributed system via a network. Communication device 790 may include any of a number of commercially available networking peripheral devices such as those used for coupling to an Ethernet, token ring, Internet, or wide area network. Communication device 790 may further be a null-modem connection, or any other mechanism that provides connectivity between computer system 700 and the outside world. Note that any or all of the components of this system illustrated in FIG. 7 and associated hardware may be used in various embodiments of the disclosure.

It will be appreciated by those of ordinary skill in the art that any configuration of the system illustrated in FIG. 7 may be used for various purposes according to the particular implementation. The control logic or software implementing embodiments of the disclosure can be stored in main memory 750, mass storage device 725, or other storage medium locally or remotely accessible to processor 710.

It will be apparent to those of ordinary skill in the art that any system, method, and process to capture media data as described herein can be implemented as software stored in main memory 750 or read only memory 720 and executed by processor 710. This control logic or software may also be resident on an article of manufacture comprising a computer readable medium having computer readable program code embodied therein and being readable the mass storage device 725 and for causing processor 710 to operate in accordance with the methods and teachings herein.

Embodiments of the disclosure may also be embodied in a handheld or portable device containing a subset of the computer hardware components described above. For example, the handheld device may be configured to contain only the bus 715, the processor 710, and memory 750 and/or 725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the disclosure for such a device would be apparent to one of ordinary skill in the art given the disclosure as provided herein.

Embodiments of the disclosure may also be embodied in a special purpose appliance including a subset of the computer hardware components described above. For example, the appliance may include processor 710, data storage device 725, bus 715, and memory 750, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent series of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion above, it is appreciated that throughout the description, discussions utilizing terms such as "capturing," "transmitting," "receiving," "parsing," "forming," "monitoring," "initiating," "performing," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "capturing", "determining", "analyzing", "driving", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The algorithms and displays presented above are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout the above specification are not necessarily all referring to the same embodiment. Furthermore, the particular features, structures, or characteristics may be combined in any suitable manner in one or more embodiments.

The present description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the various embodiments with various modifications as may be suited to the particular use contemplated.

The invention claimed is:

1. A method comprising:
   receiving at least one of optical data, from an optical sensor, of a physical space around a user of an adaptive lighting system, or audio data from an audio sensor;
   determining a user request for projected light from the received optical data or audio data;
   determining a projection area in the physical space around the user for a light source of the adaptive lighting system based, at least in part, on the received optical data or audio data;
   actuating the light source towards the projection area in response to the user request; and
   emitting light from the light source onto the projection area.

2. The method of claim 1, wherein the user request includes a user gesture and the received optical data comprises image data including user movements forming the user gesture of the user request.

3. The method of claim 2, wherein the user gesture identifies an object in the physical space around the user, and the projection area includes the object.

4. The method of claim 2, wherein the user gesture comprises hand gestures defining the projection area.

5. The method of claim 1, wherein the received optical data comprises infrared (IR) optical data and the optical sensor comprises an IR sensor.

6. The method of claim 1, wherein the user request comprises an audible user command, included in the received audio data, identifying an object in the physical space, determining the projection area in the physical space around the user is further based on the audible user command, and the projection area includes the object, the method further comprising:
   identifying the object from the received optical data of the physical space around the user.

7. The method of claim 6, wherein the audible user command further comprises a request to track the object, and the method further comprises:

actuating the light source in response to movement of the object.

8. The method of claim 1, wherein the user request comprises an audible user command, included in the received audio data, including a request for a visible color of the light from the light source.

9. The method of claim 1, wherein the user request comprises an audible user command, included in the received audio data, including a request for an intensity of the light from the light source.

10. The method of claim 1, wherein the user request comprises an audible user command, included in the received audio data, containing one or more ambiguous terms, determining the projection area in the physical space around the user is further based on the audible user command, and the method further comprises:

resolving the one or more ambiguous terms with the received optical data to determine the projection area in the physical space around the user.

11. The method of claim 1, further comprising:
selecting a light source from a plurality of light sources based on the projection area for emitting light.

12. The method of claim 1, further comprising:
moving a position of the light source closer to the projection area.

13. A non-transitory computer readable storage medium including instructions that, when executed by a processor, cause the processor to perform a method comprising:

receiving optical data, from an optical sensor, of a physical space around a user of an adaptive lighting system;

receiving a user request for light to be projected in the physical space around the user, the user request comprising at least one of an audible user command or a user gesture;

determining a projection area in the physical space around the user for a light source of the adaptive lighting system based, at least in part, on the received optical data;

actuating the light source towards the projection area in response to the user request; and emitting light from the light source onto the projection area.

14. The non-transitory computer readable storage medium of claim 13, wherein the user request comprises a user gesture and the optical data comprises image data including user movements forming the user gesture of the user request.

15. The non-transitory computer readable storage medium of claim 14, wherein the user gesture identifies an object in the physical space around the user, and the projection area includes the object.

16. The non-transitory computer readable storage medium of claim 13, wherein the user request comprises an audible user command identifying an object in the physical space, determining the projection area in the physical space around the user is further based on the audible user command, and the projection area includes the object, the method further comprising:

identifying the object from the optical data of the physical space around the user.

17. A system comprising:
an optical sensor to capture optical data of a physical space around a user of the system;
a light source; and
a light source control module to:
determine a projection area in the physical space around the user for the light source based, at least in part, on the captured optical data;
actuating the light source towards the projection area in response to a user request comprising at least one of an audible user command or a user gesture; and
control the light source to emit light onto the projection area.

18. The system of claim 17, wherein the user request comprises an audible user command containing one or more ambiguous terms, determining the projection area in the physical space around the user is further based on the audible user command, and the light source control module to further:

resolve the one or more ambiguous terms with the optical data to determine the projection area in the physical space around the user.

19. The system of claim 17, further comprising:
one or more additional light sources; wherein the light source control module to further select one of the light sources for emitting light based on the projection area.

20. The system of claim 17, wherein the light source comprises a movable light source, and the light source control module to further:
move the light source towards the projection area.

* * * * *